Patented Feb. 26, 1952

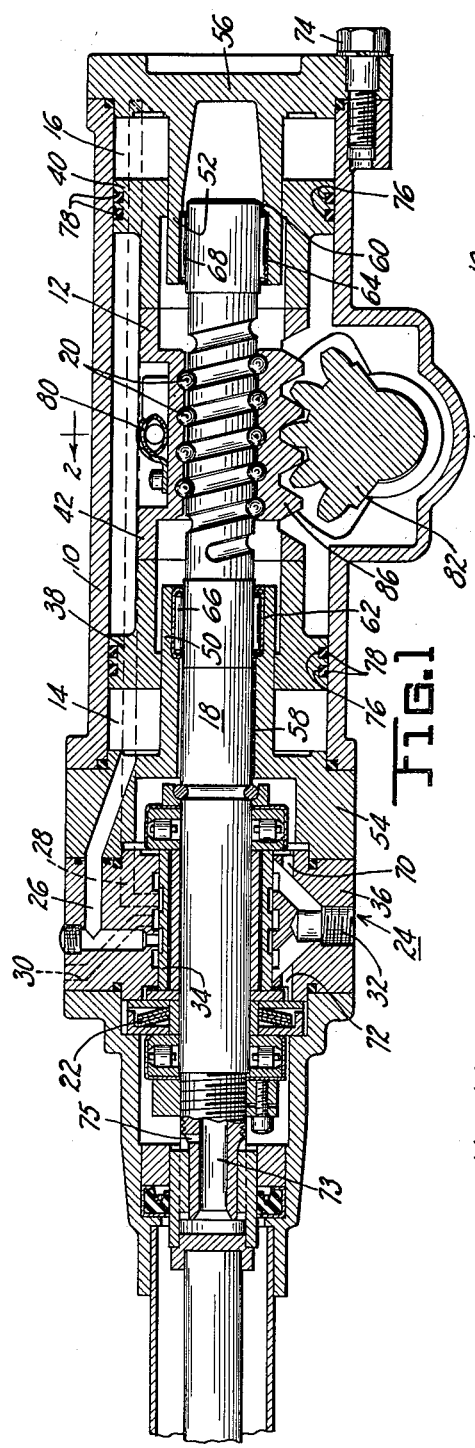

2,587,495

UNITED STATES PATENT OFFICE 2,587,495

STEERING GEAR CONSTRUCTION

Stanley I. MacDuff, South Bend, Ind., assignor to Bendix Aviation Corporation, South Bend, Ind., a corporation of Delaware Application December 3, 1948, Serial No. 63,351

6 Claims. (Cl. 180—79.2)

This invention relates to steering gear construction and more particularly to novel means of piston construction for use with power operated steering mechanisms.

It is a very important object of the invention to provide a novel construction for minimizing deleterious effects due to misalignment of parts in a worm and nut steering gear of the hydraulic power actuated type.

A further important object of the invention resides in the novel construction in a hydraulic power steering mechanism of an integral piston and nut arrangement wherein the piston is constructed and arranged to be carried concentrically of a worm shaft in such a manner that the nut may be adjusted on the worm without influencing the position of the piston.

A yet further object of the invention is to provide a novel piston construction for use in a worm and ball nut steering gear such that the nut may be adjusted for maintaining a preload on the balls and the piston ends may be distorted laterally relative to each other to compensate for eccentricities.

The above and other objects and features of the invention will be apparent from the following description of the device taken in connection with the accompanying drawing which forms a part of this specification and in which:

Figure 1 is a longitudinal sectional view of one form of steering gear mechanism with which the invention is associated;

Figure 2 is a section taken on the lines 2—2 of Figure 1; and

Figure 3 is a top plan view of the central portion of the piston with parts broken away to show more clearly the manner of adjustably connecting the sections of the piston.

Referring now to Figure 1 of the drawing in which the invention is illustrated in association with a steering mechanism, the reference numeral 10 designates a housing or motor cylinder in which a piston 12 is positioned for reciprocation within the housing. The piston divides the cylinder into two opposed chambers 14 and 16. Movement of the piston 12 may be accomplished through rotation of shaft 18 which threadedly engages the piston 12 through balls 20 to thereby move the same to the right or left depending upon the direction of rotation of the shaft. This piston movement is augmented by fluid under pressure, from a source, not shown, acting in one or the other of chambers 14 and 16 when the resistance offered to turning the shaft 18 exceeds a predetermined value as determined by a spring 22. This spring normally holds an open center valve 24 in the position shown to thereby admit fluid pressure simultaneously to chambers 14 and 16 through passages 26 and 28 respectively. Since the effective areas of the ends of the piston exposed to fluid pressure are the same there is no movement of the piston at this time with equal pressures acting on its ends. The value is equipped with inlet and outlet passages 30 and 32 communicating with the interior of the valve. Deflection of the spring 22, when the resistance offered to steering exceeds a predetermined value, permits a sleeve 34 to be moved axially relative to body member 36 so that one of the passages 26 and 28 is restricted to inlet pressure and opened wider to exhaust and the other of the passage is restricted to exhaust and opened wider to inlet pressure. Since this function of the steering mechanism forms no part of the invention a further discussion of the operation of the valve is believed unnecessary. For a more detailed discussion of the open center type valve see Patent No. 1,790,620.

The invention in the herein disclosed steering gear mechanism resides in the novel construction of the piston, bearing supports therefor, and the arrangement and construction of the ball nut as an integral part of the piston but adjustably carried thereby to permit preloading of the balls 20. The piston comprises two end sections 38 and 40 and an intermediate floating section or nut 42 which is carried by the end sections. The floating feature of the nut is obtained through the use of studs 44 which threadedly engage the two end sections and extend through holes 46 in the nut or intermediate section for threaded engagement with locknuts 48, preferably of the plastic washer type known as "Elastic Stop Nuts," to thereby securely hold the two end sections and the intermediate sections in relatively movable assembled relationship. The holes 46, only one of which is shown, are of greater diameter than the studs 44 to allow for free lateral adjustment of the nut or intermediate section relative to the end sections. Inwardly projecting tubular bearings 50 and 52 are carried respectively by housing end members 54 and 56. The end sections 38 and 40, of the piston, have a close, yet sliding fit on the tubular bearings. The end members 54 and 56 are bored at 58 and 60 to receive the shaft 18. The bores 58 and 60 are recessed at 62 and 64 to accommodate needle bearings 66 and 68. It will be noted that the shaft 18 is supported by the needle bearings 66 and 68 and that bores 58 and 60 are of greater diameter than the shaft. This permits free communication of fluid from exhaust port 32 through passage 70 to the interior of the nut and to the right end of the shaft. Another passage 72 provides free communication of fluid from exhaust port 32 to the left end of the shaft. The shaft is also bored longitudinally at 73 and radially at 75 to thereby provide communication between its ends. The shaft is therefore subjected to balanced pressures acting on its ends. Because of the sectional arrangement of the piston the bearings 50 and 52, on which piston sections 38 and 40 slide, need not be held to exact concentricities in order to maintain an unusually close, yet sliding fit, between the end sections 38 and 40 and their respective bearing supports. This close fit minimizes leakage between the chambers 14 and 16 and the interior of the nut 42, which as aforementioned is in communication with the exhaust port 32 through passage 70 and recess 62. These housing end members are secured to the housing in any suitable manner such as by cap screws 74. The end sections 38 and 40 of the piston are equipped with annular grooves 76 for the reception of piston rings 78 which are in contact relationship with the interior of the housing 10 to thereby prevent leakage between the opposed chambers. The piston rings 78 permit the outside diameters of the piston sections 38 and 40 to be a relatively free fit in the housing 10 thereby permitting substantial eccentricities between the bearing extensions 50 and 52 and the cylinder bore and between the outside and inside diameters of the piston sections. This greatly facilitates quantity production of these parts.

A transfer tube or conduit 80 connects the ends of the grooves at the opposite ends of the nut so that there will be a continuous flow of balls around the interior of the nut. This type of anti-friction screw thread is familiar to those skilled in the art and need not be discussed in more detail other than to point out that to facilitate manufacture and to promote rolling action of the balls the ball races are made of larger radius than the balls, tending to produce end play. To eliminate this end play the nut is preloaded radially against the shaft. In the present construction the balls are preloaded by moving the nut or intermediate section laterally in the housing or cylinder 10.

A greater sector 82 is fixedly secured to the rockshaft 84 so as to drivably mesh with a rack 86 formed on the underside of the nut 42. The section 82 is formed with axially tapering teeth so that axial movement of the rockshaft to the left, as viewed in Figure 2 of the drawing, will urge the nut in a radial direction, upward in the figure, to thereby preload the balls. Axial movement of the rockshaft as aforementioned will also take up backlash, if any exists between the rock and gear sector. Any suitable adjusting device for obtaining axial movement of the rockshaft 82 may be employed, such for example as the one shown, which comprises a stub shaft 88 having a swivel connection at one end with the rockshaft and a threaded portion at the other end for threadedly engaging a cover 90 adapted to fit over opening 92 in the housing.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a steering gear device utilizing fluid power to assist steering, the combination of a motor cylinder having ends with bearings therein, a piston in the cylinder, a rotatable shaft supported in said bearings and extending through said piston, said shaft and piston constructed and arranged with mating grooves, and a plurality of force transmitting elements carried partly in each of the grooves so that rotation of said shaft produces axial motion of the piston, said piston being made of sections formed and connected so that one of said sections is movable radially with respect to said shaft, and means for moving said one section radially to thereby preload said force transmitting elements.

2. In a steering gear mechanism utilizing fluid power to assist steering, the combination of a motor cylinder having ends with bearings therein, a piston in the cylinder, a rotatable shaft supported in said bearings and extending through said piston, said shaft and piston being provided with mating grooves, a plurality of force transmitting elements carried partly in each of the grooves so that rotation of said shaft produces axial motion of the piston, said piston being made of sections formed and connected so that one of said sections is movable radially with respect to said shaft, said radially movable section having a rack integral therewith, a rockshaft, a gear sector in engagement with said rack and secured to the rockshaft, and an adjustment on the rockshaft for varying the engagement between said gear sector and rack to thereby adjust for backlash and to preload the force transmitting elements.

3. In a manually operated steering gear mechanism of the type utilizing hydraulic power to assist steering, the combination of a motor cylinder having a piston therein, a tubular bearing member in each end of the cylinder and projecting thereinto so as to provide a bearing at each end of the piston, said piston comprising a plurality of sections constructed and arranged for relative lateral movement, each end of said piston forming one section of said plurality of sections, a rotatable shaft carried by said tubular bearings and passing through said piston and having a portion constructed and arranged for driving engagement with a section of said piston located between said end sections, balls interposed between the shaft and said section located between the end sections, said section located between the end sections being adjustable to thereby preload the balls, a rack integral with the piston, and means arranged in meshing relationship to said rack to be driven by said piston upon axial movement thereof.

4. In a manual and hydraulic power steering gear mechanism in combination, a motor cylinder provided with end covers having inwardly projecting tubular bearings co-axially positioned within said cylinder, a rotatable shaft carried interiorly of said tubular bearings, a piston concentric of said shaft and comprising an intermediate section and two end sections, the end sections being constructed and arranged to be carried exteriorly of said tubular bearings for slidably supporting said piston within said cylinder, said intermediate section and a portion of said shaft being formed with mating helical grooves, a plurality of balls in the grooves of the shaft and intermediate section to provide a driving couple therebetween, said intermediate section constructed and arranged for lateral movement relative to said end sections to thereby preload said balls, a rack carried by said intermediate section, and means arranged in meshing relationship to said rack to be driven by said piston upon axial movement thereof.

5. A device as described in claim 4 wherein said means is rendered adjustable relative to its meshing engagement with the rack to thereby impart lateral movement to said intermediate section.

6. In a manual and hydraulic power steering gear mechanism in combination, a motor cylinder having end covers furnished with inwardly projecting tubular bearings coaxially arranged within said cylinder, a rotatable shaft carried interiorly of said tubular bearings, a piston concentric of said shaft and comprised of sections, each end of said piston forming a section, said end sections constructed and arranged to be carried exteriorly of said tubular bearings, an intermediate section adjustably secured to the end sections for lateral movement relative thereto, said intermediate section having internal helical grooves and an external gear rack, said shaft having a portion formed with a helical groove corresponding to that of the intermediate section, a plurality of balls arranged partly in each of said grooves to provide a driving connection between said shaft and intermediate section, an axially adjustable rockshaft in the motor cylinder disposed at right angles to said rotatable shaft, a gear sector securely mounted on the rockshaft for engagement with said rack, and an adjustment for the rockshaft for taking up backlash between said gear sector and rack and for moving said intermediate section laterally to thereby preload said balls.

STANLEY I. MacDUFF.

REFERENCES CITED

The following references are of record in the file of this patent:

UNITED STATES PATENTS

| Number | Name | Date |
|---|---|---|
| 1,193,133 | Flora | Aug. 1, 1916 |
| 1,343,846 | Rapson | June 15, 1920 |
| 1,937,485 | Davis | Nov. 28, 1933 |
| 1,967,482 | Schmidt | July 24, 1934 |
| 2,073,717 | Twyman | Mar. 16, 1937 |
| 2,266,923 | Trbojevich | Dec. 23, 1941 |
| 2,267,524 | Hawkins | Dec. 23, 1941 |
| 2,388,038 | Briggs | Oct. 30, 1945 |
| 2,410,049 | Davis | Oct. 29, 1946 |

FOREIGN PATENTS

| Number | Country | Date |
|---|---|---|
| 354,327 | Great Britain | Aug. 4, 1931 |